2,910,376
METHOD OF ALUMINIZING PHOSPHOR SCREENS

James A. Stankey, Marion, Ind., and Morris N. Slater, Lancaster, Pa., assignors to Radio Corporation of America, a corporation of Delaware No Drawing. Application March 27, 1957
Serial No. 648,763

11 Claims. (Cl. 117—33.5)

This invention relates to improvements in the art of aluminizing phosphor screens for use in cathode ray picture tubes.

In certain types of cathode ray tubes such as are used in television receivers, it has proved advantageous to coat the phosphor screen inside the tube with a thin, light-reflecting, electron-pervious film of a metal such as aluminum. Such a film reflects light generated by the phosphor screen and thus intensifies the visible light passing out of the tube face plate to an observer. Other well-known advantages are also achieved with an aluminum film on a phosphor screen.

Generally, the aluminum film is formed by evaporation in vacuum onto the phosphor screen and, for optimum operation of the screen, the aluminum film must be smooth and mirror-like. However, since a phosphor screen has a rough, irregular surface due to the random distribution of the phosphor particles, it is customary to first provide a smooth film of an organic material on the phosphor screen and then to evaporate the aluminum onto the organic film. The organic film is subsequently removed by baking.

Known methods of aluminizing a phosphor screen are generally satisfactory; however too often these methods produce organic films or aluminum films which have holes and are undesirably non-uniform. In addition, none of these methods provides phosphor screens in which the light output is satisfactorily high.

Accordingly, an object of the present invention is to provide an improved method of forming a thin, light-reflecting metal film on a phosphor screen in a cathode ray tube to achieve greater light output from the screen.

Another object is to provide an improved organic resin composition and method of using said resin in a process of aluminizing a phosphor screen.

Briefly, the method of the invention comprises wetting a phosphor screen on a tube face plate sufficiently to fill the surface irregularities of the screen and thereby to present a comparatively smooth surface. After the wetting step, a novel organic film-forming liquid is applied to the screen, the liquid including both nitrocellulose and polyisobutyl methacrylate in suitable solvents, and additionally including a plasticizer. A spreading agent may also be added. The film-forming liquid is dried to form a tough continuous smooth film on which a coating of aluminum is evaporated and finally the organic film material is baked out. The foregoing steps are performed within an improved process framework which provides a phosphor screen having improved light output.

One suitable film-forming composition according to the invention includes the following materials in approximate weight percentages:

Polyisobutyl methacrylate _____ 5.5
Acryloid B72 _____ 0.08
Toluene _____ 45.7
½ sec. nitrocellulose _____ 0.72
Ethyl acetate _____ 47.6
Dibutyl sebacate _____ 0.4

In preparing the foregoing film-forming compositions, one suitable procedure comprises separately blending the polyisobutyl methacrylate, Acryloid B72, and toluene components and the nitrocellulose, ethyl acetate and dibutyl sebacate components. These two separate portions are then blended together to form the final composition.

According to this procedure, the Acryloid B72 is combined with a quantity of toluene and rolled in a suitable container for about 8 hours to form a first stock solution. The polyisobutyl methacrylate and the remainder of the toluene are then added to the first stock solution and the mixture is either rolled for about one hour or stirred for about 15 minutes until the desired solution of all of the first group of components is achieved. The nitrocellulose, ethyl acetate and dibutyl sebacate are similarly rolled in a suitable container for about 8 hours to achieve the desired solution of the second group of components. The final film-forming composition is obtained by mixing the two separate solutions thus formed and rolling them for about one-half hour. The resulting solution is filtered and is ready for use.

The foregoing composition may include the same materials in weight percent ranges as follows:

Polyisobutyl methacrylate _____ 2.5–11.0
Acryloid B72 _____ 0–2.5
Toluene _____ 40.0–70.0
½ sec. nitrocellulose _____ 0.20–1.1
Ethyl acetate _____ 30–60
Dibutyl sebacate _____ 0.1–1.0

The isobutyl methacrylate may be of the type sold by Du Pont as Lucite 45. Other suitable solvents for polyisobutyl methacrylate may be employed such as acetone, xylene, dioxane.

Acryloid B72 is utilized in the film-forming composition as a spreading agent. Acryloid B72 is a product of Rohm and Haas of Philadelphia, Pennsylvania, and is an acrylate-methacrylate copolymer. It includes an isobutyl ester of acrylic acid and other acrylic and methacrylic polymers. Other suitable spreading agents which do not conflict with the other components of the film-forming solution may be employed, for example methyl methacrylate, ethyl methacrylate, and n-butyl methacrylate.

With respect to nitrocellulose other viscosities such as ¼, 5, or 6 sec. may be employed. Dibutyl sebacate is used as a plasticizer and other plasticizers may be used such as Flexol B–400 (polyalkylene glycol) of Carbide and Carbon Chemicals Co. and dioctylphthalate. Ethyl acetate may be replaced by other suitable well known solvents for nitrocellulose such as methyl acetate, isopropyl acetate and the like.

The principles of the invention are applicable to aluminizing black and white or color phosphor screens of the type employed in television picture tubes. In such tubes, the phosphor screen is generally formed on the face plate of the tube envelope.

An optimum procedure, according to the invention, for aluminizing a phosphor screen on a face plate having a diagonal of about 21 inches is as follows. First, the phosphor screen is wetted with a suitable liquid, for example water, to fill the interstices between the phosphor particles and to present a substantially smooth screen surface. The water is preferably sprayed onto the screen under low pressure and the excess is drained off. The liquid substrate thus provided serves both as a barrier to prevent the subsequently-applied organic film-forming composition from penetrating into the phosphor screen and as a support for this organic film. It is clear that the liquid selected for the substrate should be one in which the film-forming material is substantially insoluble.

The screen is now ready for the application of the film-forming composition. For this step in the process, the tube envelope is placed in a centrifuge chuck with the face plate and phosphor screen up and substantially horizontal and the neck down. A spray gun is inserted into the neck of the envelope with a nozzle at its upper end, the nozzle being preferably of the type known as a "fog nozzle" which operates on the principle of mechanical atomization rather than air atomization and provides a substantially air-free spray. The envelope is then rotated about its axis which is vertical at about 60 r.p.m. while the organic film-forming material is sprayed onto the wet screen. About 30 to 50 cc. of the lacquer is sprayed on in about 8 seconds after which the envelope is rotated for about 15 to 40 seconds at 60 r.p.m. to spread the film material uniformly over the surface of the phosphor screen. The spinning also serves to remove excess film material by causing it to flow radially to the edge of the phosphor screen and down the wall of the envelope. Satisfactory results have been achieved in spraying a 21-inch phosphor screen by rotating the tube envelope at 50–120 r.p.m. with the spray applied for about 5 to 15 seconds. It is desirable that the organic film be as thin as possible. Suitable thicknesses are in the range of 0.0006 to 0.001 inch. The amount of spray material required to provide a desirable film thickness and the spinning speed may be easily determined without undue experimentation.

The tube is now treated to dry and harden the organic film. For this portion of the process, the tube envelope is removed from the centrifuge chuck and is suitably supported with the viewing side of the phosphor screen upright to allow further draining of the organic film-forming material from the screen. A suitable draining time under the conditions described is in the range of 7 to 15 minutes. During this time, the organic film begins to harden and contract and begins to assume a smooth contour following the contour of the wet phosphor screen. Care must be exercised not to dry the film too quickly or too slowly in order to retain its smooth contour.

Next, a cleaning operation is performed to remove the organic film material which has flowed onto and remained on the wall of the tube envelope. This material is readily removed by a jet of water which is played on it. The film drying and hardening operation is preferably completed in two steps. First a pipe connected to a suction fan is inserted into the open neck of the tube envelope and air is drawn gently out of the envelope through the pipe. Simultaneously, air is drawn into the envelope through the open neck and a gentle air turbulence is created at the film which promotes its drying and hardening. This operation proceeds for about 10 to 15 minutes and then warm air at about 30° C. to 150° C. is blown into the enevelope to complete the drying process. In the drying process, the toluene in the film-forming composition evaporates first and as it does the organic film begins to shrink. A few minutes later the water substrate evaporates through the lacquer film. When the drying is complete, the organic film has hardened sufficiently so that it stretches smoothly across the peaks of the phosphor crystals in the screen. The surface of the organic film is then very smooth and hard and is ready for the application of a metallic backing layer, preferably of aluminum.

The application of the aluminum film on the organic film is preferably performed by evaporation in vacuo as is well known. After this, the organic film is baked out at about 400° C. to leave only the smooth aluminum film adhering to the phosphor screen.

The present invention provides an aluminum film which is more opaque than similar films produced by other methods. As a result, the light output from the phosphor screen is increased by about 15%. The invention has also reduced scrap due to holes in the organic film by about two-thirds and scrap due to holes in the aluminum film by about three-quarters.

What is claimed is:

1. The method of aluminizing a phosphor screen comprising the steps of applying to said screen a quantity of a film-forming solution consisting essentially of from about 0.2 to about 1.1 weight percent nitrocellulose in a solvent, from about 2.5 to about 11 weight percent polyisobutyl methacrylate in a solvent, a plasticizer and a spreading agent; spreading said film-forming solution uniformly over said screen; drying and hardening said solution to form a smooth hard film; evaporating a coating of metal onto said film; and removing said film from beneath said coating of metal.

2. The method of aluminizing a phosphor screen comprising the steps of applying to said screen a film consisting essentially of from about 0.2 to about 1.1 weight percent nitrocellulose in a solvent, from about 2.5 to about 11 weight percent polyisobutyl methacrylate in a solvent, a plasticizer and a spreading agent; spinning said phosphor screen about a vertical axis to spread said solution thereover as a film; allowing said film to dry and harden; evaporating a coating of metal onto said film; and removing said film from beneath said coating of metal.

3. The method of aluminizing a phosphor screen comprising the steps of applying to said screen a film consisting essentially of from about 0.2 to about 1.1 weight percent nitrocellulose in a solvent, from about 2.5 to about 11 weight percent polyisobutyl methacrylate in a solvent, a plasticizer and a spreading agent; spinning said phosphor screen about a vertical axis to spread said solution thereover as a film; drying and hardening said film; evaporating a coating of metal onto said film; and removing said film from beneath said coating of metal.

4. The method of aluminizing a phosphor screen comprising the steps of wetting the phosphor screen to fill the interstices between the phosphor particles and to form a smooth surface; applying to said screen a film consisting essentially of from about 0.2 to about 1.1 weight percent nitrocellulose in a solvent, from about 2.5 to about 11 weight percent polyisobutyl methacrylate in a solvent, a plasticizer and a spreading agent; spinning said phosphor screen about a vertical axis to spread said solution thereover as a film; allowing said film to dry and harden; evaporating a coating of metal onto said film; and removing said film from beneath said coating of metal.

5. The method of aluminizing a phosphor screen comprising the steps of applying to said screen a film consisting essentially of a solution of from about 0.2 to about 1.1 weight percent nitrocellulose in a solvent, from about 2.5 to about 11 weight percent polyisobutyl methacrylate in a solvent, an acrylic plasticizer and a spreading agent; spinning said phosphor screen about a vertical axis to spread said solution thereover as a film; allowing said film to dry and harden; evaporating a coating of metal onto said film; and removing said film from beneath said coating of metal.

6. The method of aluminizing a phosphor screen comprising the steps of wetting said screen with water to fill the interstices between phosphor particles and form a smooth surface; applying to said screen a film consisting essentially of from about 0.2 to about 1.1 weight percent nitrocellulose in ethyl acetate, from about 2.5 to about 11 weight percent polyisobutyl methacrylate in toluene, an acrylic plasticizer and a spreading agent; spinning said phosphor screen about a vertical axis to spread said solution thereover as a film; drying and hardening said film; evaporating a coating of metal onto said film; and removing said film from beneath said coating of metal.

7. The method of aluminizing a phosphor screen comprising the steps of applying to said screen a film consisting essentially of from about 0.2 to about 1.1 weight percent nitrocellulose in ethyl acetate, from about 2.5 to about 11 weight percent polyisobutyl methacrylate in toluene, an acrylic plasticizer and dibutyl sebacate; spinning said phosphor screen about a vertical axis to spread said solution thereover as a film; drying and hardening said film; evaporating a coating of metal onto said film; and removing said film from beneath said coating of metal.

8. The method of aluminizing a phosphor screen comprising the steps of wetting the phosphor screen with water, spraying onto the wetted phosphor screen a solution consisting essentially of the following materials in weight percent:

| | |
|---|---|
| Polyisobutyl methacrylate | 5.5 |
| Acrylate-methacrylate copolymer | 0.08 |
| Toluene | 45.7 |
| ½ sec. nitrocellulose | 0.72 |
| Ethyl acetate | 47.6 |
| Dibutyl sebacate | 0.4 | spinning said phosphor screen to spread said solution thereover as a film, drying and hardening said film, evaporating a coating of aluminum onto said film, and removing said film from beneath said coating of aluminum.

9. The method of aluminizing a phosphor screen comprising the steps of wetting the phosphor screen with water, spraying onto the wetted phosphor screen a solution consisting essentially of the following materials and their permissible weight percent ranges:

| | |
|---|---|
| Polyisobutyl methacrylate | 2.5–11.0 |
| Acrylate-methacrylate copolymer | 0.05–2.5 |
| Toluene | 40.0–70.0 |
| ½ sec. nitrocellulose | 0.2–1.1 |
| Ethyl acetate | 30–60 |
| Dibutyl sebacate | 0.1–1.0 | spinning said phosphor screen to spread said solution thereover as a film, drying and hardening said film, evaporating a coating of aluminum onto said film, and removing said film from beneath said coating of aluminum.

10. The method of aluminizing a phosphor screen comprising the steps of spraying water onto said screen; draining excess water from said screen and leaving the interstices between phosphor particles filled with water; spinning said screen about a vertical axis at about 60 r.p.m.; spraying onto said spinning screen a quantity of a film-forming solution consisting essentially of from about 0.2 to about 1.1 weight percent nitrocellulose in a solvent, from about 2.5 to about 11 weight percent polyisobutyl methacrylate in a solvent, a plasticizer and a spreading agent; spinning said phosphor screen about a vertical axis to spread said solution thereover as a film; drying and hardening said film with a gentle stream of air at a temperature in the range of 30° C. to 150° C.; evaporating a coating of metal onto said film; and removing said film from beneath said coating of metal.

11. The method of aluminizing a phosphor screen comprising the steps of wetting the phosphor screen with water, spraying upwardly onto the wetted phosphor screen a solution consisting essentially of the following materials in weight percent:

| | |
|---|---|
| Polyisobutyl methacrylate | 5.5 |
| Acrylate-methacrylate copolymer | 0.08 |
| Toluene | 45.7 |
| ½ sec. nitrocellulose | 0.72 |
| Ethyl acetate | 47.6 |
| Dibutyl sebacate | 0.4 | spinning said phosphor screen for a time in the range of 15 to 40 seconds to spread said solution thereover as a film, allowing said screen to drain for a time in the range of 7 to 15 minutes, flowing slightly turbulent air over said film to dry it, blowing warm air on said screen, evaporating a coating of aluminum onto said film, and removing said film from beneath said coating of aluminum.

References Cited in the file of this patent

UNITED STATES PATENTS

| | | |
|---|---|---|
| 2,644,770 | Sadowsky | July 7, 1953 |
| 2,749,252 | Groner | June 5, 1956 |
| 2,792,315 | Levy | May 14, 1957 |